(12) United States Patent
Nelson et al.

(10) Patent No.: US 8,796,372 B2
(45) Date of Patent: Aug. 5, 2014

(54) SELF-HEALING ELECTRICAL INSULATION

(75) Inventors: John Keith Nelson, Niskayuna, NY (US); Brian Benicewicz, Columbia, SC (US); Atri Rungta, Columbia, SC (US); Linda S. Schadler, Niskayuna, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 74 days.

(21) Appl. No.: 13/098,111

(22) Filed: Apr. 29, 2011

(65) Prior Publication Data

US 2012/0277378 A1 Nov. 1, 2012

(51) Int. Cl.
| | | |
|---|---|---|
| C08K 3/00 | (2006.01) | |
| C08K 3/08 | (2006.01) | |
| C08K 3/18 | (2006.01) | |
| C08K 3/22 | (2006.01) | |
| C08K 3/34 | (2006.01) | |
| C08K 3/38 | (2006.01) | |
| C08K 3/40 | (2006.01) | |

(52) U.S. Cl.
USPC ........... 524/405; 524/413; 524/424; 524/430; 524/432; 524/433; 524/441; 524/445; 524/451; 524/494

(58) Field of Classification Search
USPC ......... 524/405, 413, 424, 430, 432, 433, 441, 524/445, 451, 494
See application file for complete search history.

(56) References Cited

U.S. PATENT DOCUMENTS

| | | |
|---|---|---|
| 4,054,680 A | 10/1977 | Sharbaugh et al. |
| 4,760,296 A | 7/1988 | Johnston et al. |
| 5,433,906 A | 7/1995 | Dasch et al. |
| 5,462,903 A | 10/1995 | Rousett et al. |
| 6,228,904 B1 | 5/2001 | Yadav et al. |
| 6,344,271 B1 | 2/2002 | Yadav et al. |
| 6,417,265 B1 | 7/2002 | Foulger |
| 6,498,208 B2 | 12/2002 | Border et al. |
| 6,554,609 B2 | 4/2003 | Yadav et al. |
| 6,599,631 B2 | 7/2003 | Kambe et al. |
| 6,607,821 B2 | 8/2003 | Yadav et al. |
| 6,656,986 B2 | 12/2003 | Caronia et al. |
| 7,013,965 B2 | 3/2006 | Zhong et al. |
| 7,553,512 B2 | 6/2009 | Kodas et al. |
| 7,579,397 B2 | 8/2009 | Nelson et al. |
| 7,781,063 B2 | 8/2010 | Smith et al. |
| 7,884,149 B2 | 2/2011 | Nelson et al. |
| 2003/0008123 A1 | 1/2003 | Glatkowski et al. |
| 2003/0113539 A1 | 6/2003 | Baumann et al. |
| 2003/0161959 A1 | 8/2003 | Kodas et al. |
| 2004/0134679 A1 | 7/2004 | Fomperie et al. |
| 2005/0027040 A1 | 2/2005 | Nelson et al. |
| 2005/0069718 A1 | 3/2005 | Voss-Kehl et al. |
| 2005/0256240 A1 | 11/2005 | Nelson |
| 2007/0199729 A1 | 8/2007 | Siegel et al. |
| 2009/0182088 A9 | 7/2009 | Irwin et al. |
| 2010/0036035 A1 | 2/2010 | Nelson et al. |
| 2011/0061891 A1 | 3/2011 | Schadler et al. |

FOREIGN PATENT DOCUMENTS

| | | |
|---|---|---|
| CA | 2 362 157 A1 | 9/2000 |
| DE | 40 37 972 A1 | 6/1991 |
| JP | 11-086634 A | 3/1999 |
| WO | WO 02/096982 A1 | 12/2002 |
| WO | WO 2004/034409 A1 | 4/2004 |
| WO | WO 2004/038735 A1 | 5/2004 |
| WO | WO 2004/044927 A1 | 5/2004 |
| WO | WO 2005/036563 A2 | 4/2005 |

OTHER PUBLICATIONS

Nelson J.K., Fothergill J.C., Dissado L.A. and Peasgood W., "Towards an Understanding of Nanomertric Dielectrics on the Behavior of Nanometric Dielectrics", Ann Rep. Conf. on Elect. Ins. & Diel. Phen., IEEE, 2002, pp. 295-298.

Nelson J.K., Hu Y., and Thiticharoenpong J., "Electrical Properties of $TiO_2$ Nanocomposites", Ann. Rep. Conf. on Elect. Ins. & Diel. Phen., IEEE, 2003, pp. 719-722.

Nelson J.K., and Hu Y., "The Impact of Nanocomposite Formulations on Electrical Voltage Endurance", International Conf. on solid dielectrics, IEEE, Toulouse, France, Jul. 2004, pp. 832-835.

Nelson J.K. and Fothergill J.C. "Internal Charge Behaviour of Nanocomposites", Nanotechnology, vol. 15, 2004 pp. 586-595.

Fothergill J.C., Nelson J.K., and Fu M., "Dielectric Properties of Epoxy Nanocomposites Containing $TiO_2$, $Al_2O_3$, and ZnO Fillers", Ann. Rep. Conf. on Elec. Ins. & Diel. Phen., IEEE, 2004, pp. 406-409.

Nelson J.K., MacCrone R.K., Utracki L., Reed C.W., "The Role of the Interface in Determining the Electrical Properties of Nanocomposites", Ann. Rep. Conf. on Elec. Ins. & Diel. Phen., IEEE, 2004, pp. 314-317.

Nelson J.K. and Hu Y., "Nanocomposite Dielectrics—Properties and Implications", J. Phys. D (Appl. Phys.), (accepted for publication, Dec. 2004).

Abstract of DE4037972; Dr. Thomas Baumann; "High Voltage Insulator Component—Comprising Plastics Matrix Containing Finely Dispersed Sub-Micron Size Oxide Prticles"; Jun. 27, 1991.

(Continued)

*Primary Examiner* — Kriellion Sanders
(74) *Attorney, Agent, or Firm* — Curatolo Sidoti Co., LPA; Joseph G. Curatolo; Salvatore A. Sidoti

(57) ABSTRACT

Electrical insulation comprising a polymeric matrix having compounded therein, a functionalized dielectric nanoparticle filler comprising a self-healing moiety, dispersible in the polymeric matrix, wherein the electrical insulation is capable of self-healing upon exposure to corona discharge.

21 Claims, 12 Drawing Sheets

(56) References Cited

OTHER PUBLICATIONS

International Search Report and Written Opinion, mailed Aug. 31, 2007 for PCT International Patent Application No. PCT/US2006/002892.

International Preliminary Report on Patentability, mailed Jul. 3, 2008 for PCT International Patent Application No. PCT/US2010/002892.

Dissado, L.A. and Fothergill, J.C., "Dielectrics and Nanotechnology", IEEE Transactions on Dielectric and Electrical Insulation, October, pp. 737-738, vol. 11, No. 5, IEEE Xplore.

Boyes, Stephen G., et al., "Polymer brushes-surface immobilized polymers", Surface Science, 2004, pp. 1-12, vol. 570, Elsevier B.V.

Advincula, Rigoberto C., "Surface Initiated Polymerization from Nanoparticle Surfaces", Journal of Dispersion Science and Technolgy, 2003, pp. 343-361, vol. 24, Nos. 3 & 4, Macel Dekker, Inc., NY.

Edmondson, Steve, et al., "Polymer brushes via surface-initiated polymerizations", The Royal Society of Chemistry, 2004, pp. 14-22, vol. 33.

Li, Chunzhao, et al., "Synthesis of Well-Defined Polymer Brushes Grafted onto Silica Nanparticles via Surface Reversible Addition-Fragmentation Chain Transfer Polymerization", American Chemical Society, 2005, pp. 5929-5935, vol. 38.

Li, Chunzhao, et al., "A Versatile Method to Prepare RAFT Agent Anchored Substrates and the Preparation of PMMA Grafted Nanoparticles", American Chemical Society, 2006, pp. 3178-3183, vol. 39.

Li, Wu, et al., "Well-Controlled Polymerization of 2-Azidoethyl Methacrylate at Near Room Temperature and Click Functionalization", Wiley InterScience, pp. 4300-4308.

Nelson, J. Keith, et al., "Towards an understanding of nanometric dielectrics", Annual Report Conference on Electrical Insulation and Dielectric Phenomena, 2002, pp. 295-298, IEEE.

Li, Yu, et al., "Surface and Particle Modification via the RAFT Process: Approach and Properties", Handbook of RAFT Polymerization, Sep. 6, 2007, pp. 423-454, Wiley-VCH Verlag GmbH & Co.

Ohba, Kaoru, "Overview of Phot-definable Benzocyclobutene Polymer", 2002, Journal of Photopolymer Science and Technology, pp. 177-182, vol. 15, No. 2.

Mehta, Goverdhan and Kotha, Sambasivarao, "Recent chemistry of benzocyclobutenes", Tetrahedron, 2001, pp. 625-659, vol. 552, Elsevier Science Ltd.

Farona, Michael F., "Benzocyclobutenes in Polymer Chemistry", Prog. Polym. Sci., 1996, pp. 505-555, vol. 21, Elsevier Science Ltd.

PCT/US2012/031598—International Search Report, Oct. 12, 2012.

PCT/US2012/031598—Written Opinion of the International Searching Authority, Oct. 12, 2012.

PCT/US2012/031598—International Preliminary Report on Patentability, Oct. 29, 2013.

R = PDMS

SELF-HEALING ELECTRICAL INSULATION

A self-healing electrical insulation is provided which is capable of filling voids in or at least partially repairing damage to a dielectric material in which internal partial discharge (corona) occurs.

Partial discharge, also known as corona, is a phenomenon which occurs within insulation systems subjected to high voltage stress (i.e., voltage gradients) and which is accompanied by the emission of light. When the electric stress exceeds a critical value, transient gaseous ionization (plasma discharge) occurs within the insulation system which can result in degradation of the insulation system and ultimately system failure. One mechanism for this failure is electrical treeing, in which the discharges create branching void channels (trees) in the insulation. Discharges within the tree channels can create new channels as well as lengthen and widen existing channels. When the trees bridge the electrodes, a conducting path is created and the insulation fails.

Corona causes the ionization of oxygen and the formation of ozone within the insulation material. Ionization is typically localized over a portion of the distance between the electrodes present within the insulation system. Corona usually occurs in voids within the insulation system and adjacent to conductors exhibiting divergent electric fields. An example of a micro-void typically found within electrical polymeric insulation is shown in FIG. 1.

Corona inception voltage is the lowest voltage at which a continuous corona of specified pulse amplitude occurs as the applied voltage is gradually increased. Corona extinction voltage is the highest voltage at which a continuous corona of specified pulse amplitude no longer occurs as the applied voltage is gradually decreased from above the corona inception value.

Figure 1:
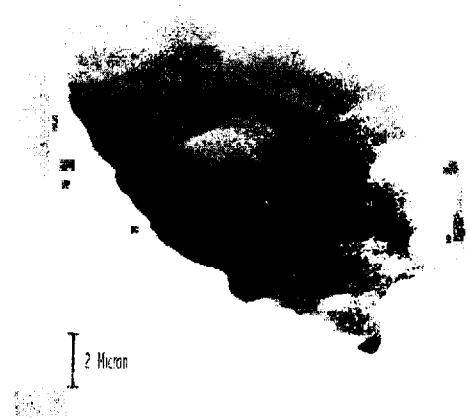
FIG. 1 is a photo micrograph of a micro-void within a polymer.

Provided is electrical insulation comprising a polymeric matrix having compounded therein, a functionalized dielectric nanoparticle filler comprising a self-healing moiety, dispersible in the polymeric matrix, wherein the electrical insulation is capable of self-healing upon exposure to corona discharge.

The electrical insulation is suitable for use in power cables, cable accessories, capacitors, high-voltage machine insulation, and all situations where structural insulation supports elevated voltages. It is applicable for high AC voltage, medium AC voltage, low voltage AC and some high DC voltage situations.

The electrical insulation is suitable for use in high voltage applications, such as power cables and cable accessories. However, the applications for the disclosed electrical insulation is not limited to these products, as there is a wide range of insulation applications and products of interest to the power industry. For example, the electrical insulation may be adapted not only for AC or DC high voltage, but may also be adapted for low or medium voltage.

Low voltage is typically up to about 5 kV, medium voltage is typically between about 5 and about 60 kV, and high voltage is typically 60 kV and higher. As a further example, the electrical insulation can be extruded or formed into tape for insulating super-conducting cables. As the voltage gradient and not the voltage per se is the controlling variable, insulation at quite low voltages can exhibit partial discharges if the electric field is sufficiently divergent.

"Nanoparticle" is generally defined as a particulate material having an average particle or grain size between 1 and 100 nanometers in at least one dimension. Nanoparticles are distinguishable from particles having a particle size in the micron range, that is, greater than about 1 μm. Nanoparticles ranging in particle size from about 5 nm up to about 100 nm, in certain embodiments, from about 5 nm to about 20 nm and in other embodiments, from about 20 nm up to about 50 nm may be used in the subject electrical insulation.

The high surface area of nanoparticles and dominant interfacial volume in nanocomposites permit nanoparticles to deliver a self-healing chemistry to polymeric electrical insulation materials. In addition to the large amount of interfacial volume generated, the small size of the nanoparticles result in the interparticle distance being small, allowing for the self-healing material to be well dispersed in the matrix. For example but not by way of limitation, the average interparticle distance for randomly dispersed nanoparticles at 1 volume % (or about 2 weight percent) for 15 nm diameter particles is 15 nm, but for 1 μ diameter particles is 970 nm. In general, a zone of interaction on the order of about 10 nm may determine many of the nanocomposite properties.

The nanoparticle filler may be at least one of metal borides, metal carbides, metal carbonates, metal nitrides, metal oxides, mixed metal oxides, metal silicates, metal titanates, carbon nanotubes, carbon or ceramic nano-fiber whiskers, alumina, silica, titania, zirconia, aluminum nitride, barium oxide, barium strontium titanate, barium titanate, calcium oxide, glass particles, kaolin clay, magnesium aluminum silicate, magnesium calcium silicate, magnesium oxide, silicon carbide, strontium oxide, strontium titanate, talc, zinc oxide, zirconium silicate or mixtures thereof. In certain embodiments, the nanoparticle filler is silica. Representative silicas include, without limitation, quartz and amorphous silica, such as fumed silica or precipitated silica.

The functionalized nanoparticle filler suitable for electrical insulating applications may comprise from greater than zero to up to 5% by weight of the polymeric electrical insulation (considering the weight of the particles themselves and not the weight of the functional moieties). In certain embodiments, the functionalized nanoparticle filler may comprise from greater than 0 to about 2% by weight of the polymeric electrical insulation, in other embodiments from about 0.1% to about 1%, optionally from about 0.1% to about 0.2% by weight of the polymeric electrical insulation.

The self-healing moiety of the functionalized nanoparticle filler may comprise a plasma reactive chemical group or moiety. By plasma reactive it is meant that chemical or physical charges can be brought about through the energy available in the energetic electrons, ions, and photons which make up the plasma. For example, upon exposure to corona discharge plasma, the plasma reactive group may form a free radical or other reactive group, and may undergo or induce a curing polymerization reaction, whereby cross-links with the polymeric matrix or other functionalized nanoparticles are formed to heal cracks within the insulation material. The plasma reactive group, therefore, may function as a self-healing agent. The plasma reactive group may be both thermally stable at temperatures up to at least 200° C., and unreactive during compounding of the nanoparticle filler and the polymeric matrix.

The plasma reactive or self-healing moiety may comprise at least one polymerizable monomer or reactive monomer residue which is capable of undergoing self-healing reactions in the high energy environment created by a partial discharge. In certain embodiments, the plasma reactive moiety contains either a carbon-carbon double bond or a carbon-carbon triple bond. The carbon-carbon double bond or carbon-carbon triple bond may or may not be halogenated, such as fluorinated. In certain embodiments, the polymerizable monomer containing the carbon-carbon double bond or carbon-carbon triple bond is at least partially halogenated, or fluorinated.

Electrical insulation having functionalized nanoparticles may self-heal upon exposure to plasma discharge or corona by the crosslinking of the self-healing moieties to the polymeric matrix and/or to moieties on other functionalized nanoparticles. In certain embodiments, functionalizing agents that have been shown to be effective at cross-linking may include multiple polymer chains comprising at least one block copolymer that is formed from a polymerizable monomer.

The block formed from the polymerizable monomer may contain a siloxane side group or may be a linear block of a siloxane type polymer. In one embodiment, detailed chemical analysis has shown trioxyvinylsilane to be suited for use as a linking group to bond multiple polymer chains because the vinyl group can bond to the polymer while the silane couples to —OH groups at the particle interface. In another embodiment, poly(dimethyl siloxane) (PDMS) is suitable for use with bonding multiple polymer chains. In other embodiments, the linking group may be a phosphonate, particularly if the filler is not silica.

In various functionalizing treatment methods, a coupling agent, such as a silane or phosphate coupling agent, links to a nanoparticle. The other end of the coupling agent may have an initiator for a polymerization reaction or a linker group for grafting an existing polymer chain to the surface.

Mechanisms of self-healing via a plasma reactive moiety coupled to a nanoparticle may include providing a cross linking agent to effect a measure of self healing in the original insulation polymeric matrix, providing a polymerizable material to lay down new polymer in the micro-void, or providing a chromophore to generate local heating and thus some melting of the existing insulation polymeric matrix.

Figure 3:
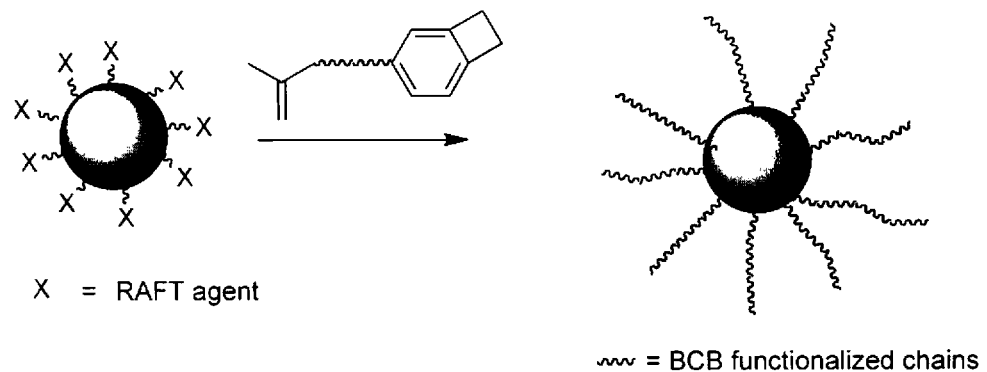
FIG. 3 is a schematic diagram of a general RAFT functionalization of nanoparticles reacted with generalized BCB containing monomers.

Plasma reactive groups or moieties have been discovered which appear to impart self-healing properties when exposed to plasma discharge within a dielectric medium such as polymeric electrical insulation. These plasma reactive groups may be incorporated into the functional moiety attached to the surface of the nanoparticle filler through the radical polymerization techniques discussed below. According to one embodiment, the plasma reactive group comprises at least one benzocyclobutane (BCB) containing monomer or monomer residue. Benzocyclobutane may be attached to the nanoparticle surface via RAFT polymerization (discussed herein below) through the use of azo initiators. An example of this process is set forth in FIG. 3. A RAFT agent bonds to the nanoparticle, and anchors the forming BCB polymer chain. These groups have thermal stability in excess of 200° C., which is well above the normal processing temperatures of many types of insulation. Benzocyclobutane is capable of crosslinking to the polymeric matrix or to moieties on other functionalized nanoparticles upon exposure to high energy discharges. For example, upon exposure to UV irradiation or light, benzocyclobutane forms a di-radical which is capable of crosslinking. In other embodiments, the plasma reactive group may comprise poly(dimethyl siloxane) or a fluorine-based polymer.

The nanoparticle filler may be functionalized with multiple polymer chains, wherein at least one of the multiple polymer chains comprises the self-healing moiety. The architecture of the functional group may be one of block, gradient or random structure. In one embodiment, the nanoparticle filler comprises silica, a functional moiety comprising up to three blocks of polymer chains wherein at least one of the blocks comprises a self-healing moiety, wherein the functional moiety covalently links the nanoparticle to the self-healing block, and an end group that may vary in structure depending on the method of polymerization.

The polymer grafted nanoparticles or nanocomposites may comprise a second polymer block to improve the compatibility of the particles with the polymeric matrix. In certain embodiments, the compatibility improving outer block is a copolymer of hexyl methacrylate and glycidyl methacrylate, in some embodiments in a mass ratio of between about 4:1 and about 2.5:1. In other embodiments, the compatibility improving outer block comprises poly (glycidyl methacrylate (PGMA). Both the copolymer of hexyl methacrylate and glycidyl methacrylate, and PGMA may be used as compatibility improving outer blocks to improve the compatibility of the nanoparticles with an epoxy matrix.

Figure 4:
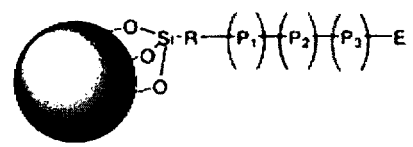
FIG. 4 is a representation of a nanoparticle containing a block copolymer compatible with the bulk matrix which has a self-healing moiety.

An example of a nanoparticle filler functionalized with multiple block co-polymers containing at least one block comprising a self-healing moiety is shown in FIG. 4. According to FIG. 4, a linking group (R) provides a covalent linkage between the (siloxane) functionalized nanoparticle and the self-healing block. Typically, the second block may constitute the outer block to compatabilize the nanoparticles with the matrix. At least one of the polymer chains ($P_1$, $P_2$ and $P_3$) comprises a block that is formed from a polymerizable monomer that may contain a siloxane containing side group, or may be a linear block of a siloxane type polymer. In addition, at least one of the polymer chains ($P_1$ $P_2$ and $P_3$) comprises a block that is formed from a polymerizable monomer that may contain a carbon-carbon double or triple bond that may or may not be fluorinated. The end group (E) may vary in structure depending on the method of polymerization. In certain embodiments, the end block of the polymer grafted nanoparticles or nanocomposites may improve the compatibility of the particles with the polymeric matrix.

By being functionalized, it is meant that the surface of the nanoparticle filler has been treated to result in the presence of a functional moiety prior to preparing the polymeric electrical insulation.

The functional moiety may be attached to the nanoparticle filler by treating the surface of the nanoparticle filler with a precursor compound which ultimately forms a surface moiety on the surface of the nanoparticles. The nanoparticle-precursor complex may then be treated by known methods, such as by wet chemistry treatment with a solution or by plasma processing, to form a reaction residue or surface moiety on the surface of the nanoparticle filler. This reaction residue comprises the nanoparticle filler surface moiety which anchors the self-healing functional moiety to the nanoparticle. In certain embodiments, the self-healing moiety is grown from the surface of the nanoparticles through controlled radical polymerization techniques. Typically, the nanoparticle-precursor complex is treated with an initiator such as a RAFT Agent which allows the polymer to grow on the nanoparticle.

Alternatively, in some embodiments, the self-healing moiety may possess a linking group for anchoring the self-healing moiety to the surface of the nanoparticle filler.

In certain embodiments the nanoparticle filler surface moiety comprises an organosilane. In certain embodiments, the nanoparticle filler surface moiety comprises an organic group selected from alkyl, alkylamino, alkoxy, amino, alkoxyamino, carboxy and vinyl, or combinations thereof. In certain embodiments, the nanoparticle filler surface moiety precursor comprises at least one of alkoxyamine, aminosilane, hexamethyldisilazane, vinyltriethoxysilane, trioxyvinylsilane, poly(dimethyl siloxane), or fluorine-based monomers or polymers.

Various precursor compounds may be used to form the surface moiety to attach the functional self-healing moiety on the surface of the nanoparticles. In certain embodiments, the precursor compound which forms the nanoparticle filler surface moiety is a reaction residue of trioxyvinylsilane. As discussed above, the nanoparticle may be functionalized with an initial surface moiety that attaches to the nanoparticle an initiator capable of initiating polymerization of a self healing moiety polymer, such as a reaction residue of poly(dimethyl siloxane), or a reaction residue of methacrylic acid and 4,5,5-trifluoropent-4-en-1-ol (yielding 4,5,5-trifluoropent-4-enyl methacrylate).

In certain embodiments, the self-healing moiety may be a cross-linking agent which can effect a measure of healing in the insulation polymeric matrix. Alternatively, the self-healing moiety may be a polymerizable material which can lay down new polymer in a micro-void in the insulation. In other embodiments, the self-healing moiety may be a chromophore which generates local heating and melting of the existing insulation polymeric matrix.

In certain embodiments, it is desired that the functional moiety be concentrated in the interfacial zone of the nanoparticles and the matrix and that the surface of the nanoparticle possess a high concentration of functional moieties. The interfacial zone may extend up to 10 nanometers or more beyond the surface of the nanoparticle, depending upon the chemistry of the moiety constituents.

The functional moiety attached to the surface of the nanoparticle filler by the anchor surface moiety is unreactive to fluctuations in temperature and therefore, stable during composite processing, but is reactive when exposed to plasma discharge. There are certain factors that permit the functional moiety to tolerate normal processing conditions yet be highly reactive for crosslinking and healing in the plasma discharge environment. For example, in certain embodiments, the functional moiety comprises a chain graft density ranging from 0.01 chains/nm$^2$ to 0.8 chains/nm$^2$, a chain length ranging from a few mers (repeating units) to 250,000 g/mole, and a polydispersity of from about 1.1 to about 2.5.

The functionalized, dielectric nanoparticle filler may be substantially homogeneously distributed throughout the electrical insulation. Because of the tendency of nanoparticles to agglomerate, shear forces may be applied to the nanoparticle-polymer mixture in order to obtain a homogeneous distribution of nanoparticles throughout the polymeric matrix. "Agglomerated" means that individual particles adhere to neighboring particles, primarily by electrostatic forces.

The bulk polymer used in the polymeric matrix of the electrical insulation may comprise a thermoplastic polymer, a thermosetting polymer or a thermoplastic elastomer. Suitable bulk polymers for use within the polymeric matrix include epoxy, polyethylene, polypropylene, polyimide, polyamide, polystyrene, polystyrene-butadiene, polysulphone, polyvinylidene fluoride, polyamideimide, phenolics, and polyether ether ketone, polyurethane, polyurea, polyvinylchloride, polyvinylidenechloride, polytetrafluoroethylene, formaldehyde-based resins, polyphenylene sulfide, polysulfone, or mixtures or copolymers thereof.

In certain embodiments, epoxy or polyethylene are utilized as the bulk polymer within the polymeric matrix of the dielectric electrical insulation material. In certain embodiments, the nanoparticle medium of choice is silicon dioxide (silica), having a low dielectric loss. In certain embodiments, the nanoparticle is silica, the polymeric matrix comprises epoxy, and the nanoparticle is functionalized with a reaction residue of poly(dimethyl siloxane). In other embodiments, the nanoparticle is silica, the polymeric matrix comprises epoxy, and the nanoparticle is functionalized with a reaction residue of fluorine-based polymer, such as poly(4,5,5-trifluoropent-4-enyl methacrylate).

A variety of diluents and additives which are well known to those skilled in the art may used to disperse the functionalized dielectric nanoparticle filler within the polymeric matrix. Such diluents, if used, are removed from the polymeric matrix after dispersion of the functionalized nanoparticles. Examples of diluents and additives which may be used include water, oils, antioxidants, coupling agents, cross-linking agents, diluents, pigments and dispersants. In some embodiments, a solvent such as tetrahydrofuran or dichloromethane may be added to an epoxy resin.

There are several known procedures that may be used to incorporate the functional moiety onto the outer layer of the nanoparticles. These procedures involve the use of controlled radical polymerization techniques. Examples of radical polymerization techniques that may be used to add the functional moiety onto the surface of the nanoparticle include nitroxide mediated polymerization (NMP), atom transfer radical polymerization (ATRP), and reversible addition-fragmentation chain transfer polymerization (RAFT).

Nitroxide mediated polymerization (NMP) is a living polymerization reaction, meaning that there is no termination step in the polymerization process. The NMP polymerization process comprises binding an alkoxyamine initiator molecule to the surface of the nanoparticle. The surface bound alkoxyamine initiator is then heated to a temperature sufficient to cleave the alkoxyamine moiety off to yield a surface bound alkyl radical and a stable nitroxide radical. The surface bound alkyl radical may then react with various monomers propagating the polymer chain. The propagation step is controlled by reversible capping of the polymer chain with the nitroxide leaving group.

Atom transfer radical polymerization (ATRP) is also a living polymerization reaction, meaning that there is no termination step in the ATRP polymerization process. There are three separate reactions which take place within the ATRP reaction overall: initiation, equilibrium with a dormant species, and propagation. The components necessary for ATRP to take place include an initiator, a monomer, a catalyst, a solvent and heat. The ATRP polymerization process comprises immobilizing a monolayer bearing an ATRP initiator head group onto the surface of the nanoparticle filler. The ATRP initiator typically comprises an alkyl halide. In the initiation reaction, the ATRP initiator is brought into contact with a transition metal based catalyst having an affinity for halogens and a strong ligand complexation. The catalyst cleaves the halide from the ATRP initiator forming an alkyl radical. This alkyl radical may then react with monomer to form an active species. The second reaction of ATRP also involves bringing an alkyl halide in contact with a transition metal based catalyst having an affinity for halogens and a strong ligand complexation. The catalyst cleaves the halide from the ATRP initiator forming a dormant alkyl radical. The dormant alkyl radical then reacts with the active species containing monomer in the propagation reaction to form the desired polymer. ATRP generally allows for uniform polymer chain growth and low polydispersity. The size of the formed polymer is controlled through the use of the transition metal based catalyst which provides an equilibrium between formation of the active propagating species of the polymer and formation of the dormant species of the polymer.

Reversible addition-fragmentation chain transfer polymerization (RAFT) is also a living polymerization reaction, meaning that there is no termination step in the RAFT polymerization process. RAFT requires the presence of an initiator, monomer, chain transfer agent (such as dithioesters, trithiocarbonates, or xanthates) and a solvent. The RAFT process begins by decomposing the initiators into free radicals. An example of an initiator which may be used is azobisisobutyronitrile (AIBN), an azo initiator. The initiator is attached to the surface moiety of the nanoparticles allowing for propagation of the polymer. The initiators are then added to monomers to form short chain propagating radicals. These short chain propagating radicals are then added to a chain transferring agent (such as but not limited to a polymeric thiocarbonylthio compound) forcing the release of an alkyl radical from the chain transferring agent and resulting in the formation of new radicals. The alkyl radicals released from the chain transferring agent reinitiate with monomers and form new short chain propagating radicals which are then added to the chain transferring agent. This reaction proceeds until the concentration of active short chain propagating radicals are at equilibrium with the concentration of short chain propagating radicals bound to the dormant chain transferring agent.

The controlled radical polymerization techniques mentioned above are used to create polymer "brushes" which comprise the functional moiety of the nanoparticle filler. Polymer brushes are an assembly of polymer chains which are tethered by one end to the surface or interface of the nanoparticle filler by covalent attachment. Polymer brushes may be attached to the nanoparticle fillers by either the "grafting to" or "grafting from" techniques. In the "grafting to" technique, pre-formed end-functionalized polymer chains are tethered to the nanoparticle filler under the appropriate conditions. This technique involves allowing the polymer molecules to diffuse through the existing polymeric matrix to reach the reactive sites on the surface of the nanoparticle fillers. Consequently, this technique often leads to low grafting density and low film thickness. In the "grafting from" technique, initiators are immobilized onto the nanoparticle substrate followed by in situ surface initiated polymerization to generate the tethered polymer brush. Surface immobilized initiators are created by treating the nanoparticle substrate with plasma or glow discharge in the presence of gas or forming an initiator containing self-assembled monomer layers on the nanoparticle surfaces. The "grafting from" technique results in thick tethered polymer brushes with high grafting density.

Figure 2:
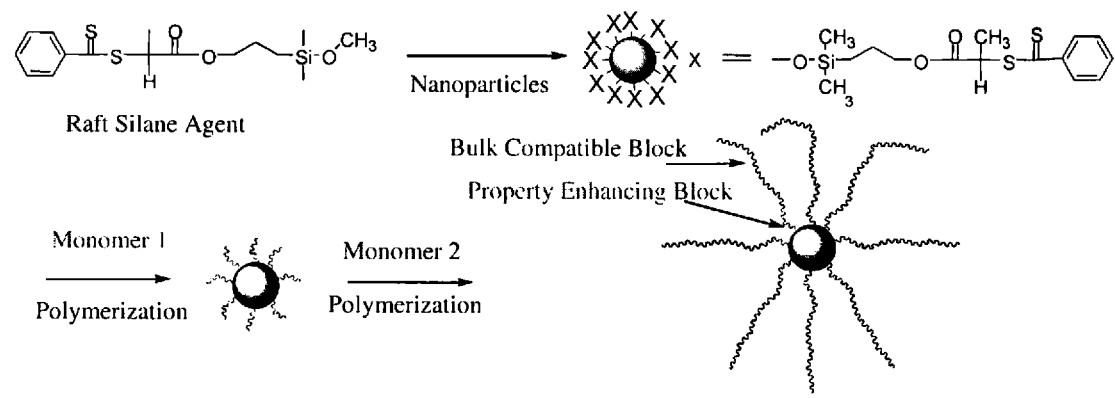
FIG. 2 is a schematic diagram of a general RAFT synthesis method used in preparing block copolymers grafted onto nanoparticles.

An example of the synthesis of functionalized dielectric nanoparticles created by the "grafting from" technique is shown in FIG. 2. According to FIG. 2, a RAFT silane agent is used to immobilize the functional moiety on the surface of the nanoparticle. The functionality on the nanoparticle may be then polymerized by treatment, such as free radical polymerization in the presence of additional monomers (monomer 1 and monomer 2) to form a bulk compatible block on the end of the functionalized nanoparticle.

With these methods, it is possible to control various parameters such as the chemistry, chain length, chain density, and layer thickness of the functional moiety in order to design specially tailored nanoparticle interfaces. In certain embodiments, the RAFT polymerization technique is used to ensure that certain variables on the surface of the nanoparticles meet the requisite criteria for rendering the functional moiety most effective as a self-healing agent. For example, the RAFT polymerization technique may be used to control certain variables such as chain graft density, chain length, and polydispersity of the functional moiety. In certain embodiments, the functional moiety has a graft density ranging from about 0.01 chains/nm2 to about 0.8 chains/nm2, a chain length ranging from a few mers to about 250,000 g/mole, and a polydispersity from about 1.1 to about 2.5.

Figure 5:
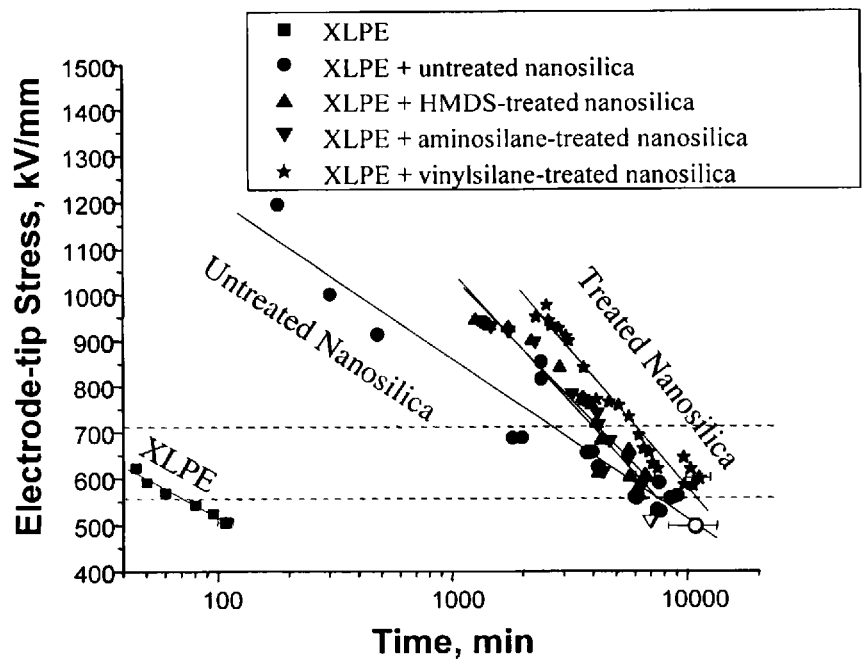
FIG. 5 is a graph showing voltage endurance characteristics for cross-linked polyethylene nanocomposites.

A benefit to the incorporation of the functionalized nanoparticles in polymer insulation is that these particles can independently improve the resistance to failure due to electrical treeing. In the case of voltage endurance, improvements over one order of magnitude in lifetime have been observed in polyethylene and epoxy matrices. An example of this improvement in the voltage endurance of cross-linked polyethylene with the addition of silica nanoparticles is shown in FIG. 5. FIG. 5 is a graph showing the voltage endurance for various cross-linked polyethylene-silica nanocomposites using a needle-plane geometry. FIG. 5 shows a significant improvement in endurance due to the addition of nanofillers having a compatibilizing surface treatment. The improvements provided by the addition of compatabilized nanoparticles are attributed to retardation of tree initiation by suppressing electron injection, enhanced partial discharge resistance and hindrance of tree growth due to scattering of carriers from the nanoparticles. Ceramic nanoparticles can act to shield polymers from partial discharge activity, limiting damage to the material. As mentioned above, the interface in nanocomposite systems assists in determining the response of the composite. By grafting compatibilizing small chains or polymers onto the surface of the nanoparticles, this interface can be tailored to improve certain properties. As is shown in FIG. 5, this approach provides an increase in voltage endurance at high stress and is augmented by particle surface treatment.

In certain embodiments, the nanoparticle filler comprises silica and the functional moiety comprises multiple polymer chains (at least one chain including a self-healing block), a surface moiety that provides a covalent linkage between the nanoparticle and the self-healing block, and an end group that may vary in structure depending on the method of polymerization. The polymer chains of the functional moiety may contain up to three blocks of different chemistries which may be added to the surface of the nanoparticles, for example, via nitroxide mediated polymerization (NMP), atom transfer radical polymerization (ATRP), or reversible addition-fragmentation chain transfer polymerization (RAFT). At least one of three blocks comprises a plasma reactive group (i.e., the self-healing moiety) which is capable of polymerizing or curing upon partial discharge of the dielectric material. The self-healing moiety may be a siloxane containing group attached to the polymer chain as a side chain of the block, or may be a linear block wherein the siloxane group is incorporated into the backbone of the polymer chain.

The functional chemistries of the subject grafted polymers are chemically inert under the curing conditions of the insulation polymer matrix, while providing the ability to crosslink in the presence of local discharges. Siloxane groups are known to have thermal stability in excess of 200° C., well above the normal processing temperatures of many types of insulation, are also not reactive under the conditions of the RAFT polymerization, but can crosslink in the presence of plasma. Similarly, the C=C double bond stabilized by fluorine is stable during polymerization, but is able to crosslink during discharge events. PDMS can crosslink in the presence of plasma. Plasmas can cause radicals to form on the PDMS chains, with subsequent condensation leading to crosslinks. The radical formation can be caused by the presence of UV radiation or impingement of a gaseous ion with the polymer. In the case of electrical trees, plasma will be generated within the tree channels. The plasma can lead to further damage of the matrix material, eventually leading to failure. In the case of the PDMS treated particles, the localized discharges can cause crosslinking, giving the potential for self-healing of the material.

Other approaches are possible, such as the incorporation of polymerizable monomers allowing new polymer to be deposited at defects or the addition of chromophores that can generate local heating, leading to the melting or softening of thermoplastic polymers.

Processing Electrical Insulation Articles

The electrical insulation dielectric material may be produced by providing the appropriate functionalized dielectric nanoparticle filler, drying the functionalized dielectric nanoparticle filler, and thereafter compounding a polymer with the dried functionalized dielectric nanoparticle filler. Compounding may be carried out by imparting a shear force to the mixture of the polymer and nanoparticle filler that is capable of preventing agglomeration of the nanoparticle filler. The high shear mixing may be conducted such that the nanoparticle filler is substantially homogeneously distributed within the electrical insulation dielectric material.

A suitable processing method to make and use the dielectric material for electrical insulation articles can be summarized by the following steps:
1. Mixing the nanoparticles with the bulk polymer in a high speed sheer mixer.
2. Adding hardener to the mixture of nanoparticles and bulk polymer and continue mixing.
3. Removing any solvent remaining from the mixture and continue mixing.
4. Optionally, pelletizing the compounded dielectric material.
5. Optionally, contacting the pellets with or mixing in a cross-linking agent.
6. Forming the insulation article such as through extrusion or pressing.
7. Crosslinking the article to form nanoparticle filler crosslinked with the bulk polymer.
8. Forming the insulation article.
9. Cooling the insulation article.
10. Removing any byproducts from the insulation article.

Other processing methods of compounding a nanoparticle filler within a polymeric matrix may be used.

EXAMPLES

Plasma crosslinkable functional groups were polymerized from silica nanoparticle surfaces using the reversible addition-fragmentation, chain transfer polymerization (RAFT) technique. The plasma reactive polymers were synthesized both with and without an outer block. The function of the outer block was to improve compatibility between the functionalized nanoparticle filler and an epoxy matrix.

Two strategies were used to incorporate the functional groups on the surface of nanoparticles which were capable of tolerating normal processing conditions, yet displayed high reactivity for crosslinking and healing in the plasma discharge environment. One strategy involved the use of a poly (dimethyl siloxane) based material (PDMS) and the second strategy involved the use of fluorine-based polymers.

Poly(dimethyl siloxane) Based Material (PDMS)

Poly(dimethyl siloxane) (PDMS) containing monomers were used as a plasma reactive group. Two different monomers were used, having different side chain lengths of 700 g/mol or 1000 g/mol. An example of a PDMS containing monomer is shown in formula (I).

(I)

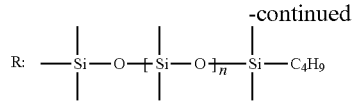

This PDMS containing monomer is a monomethacrylate poly(dimethyl siloxane) monomer having a thermally stable, plasma reactive side chain of length "n".

Figure 6:
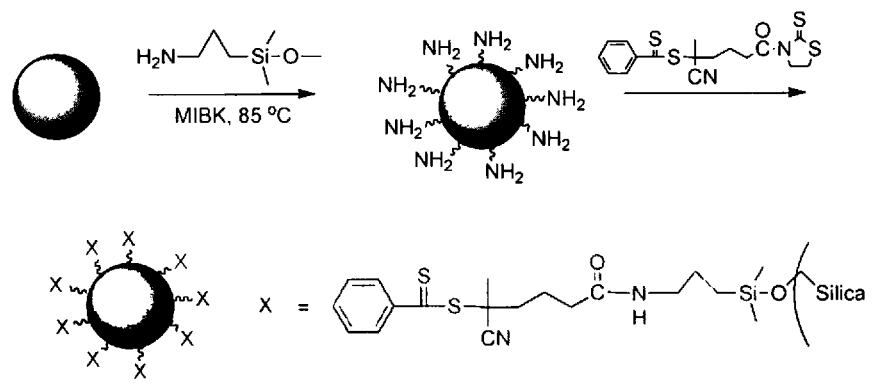
FIG. 6 is a schematic diagram of the synthesis of RAFT chain transfer agent-anchored nanoparticles in methyl isobutyl ketone.

RAFT functionalized nanoparticles were prepared by the synthetic scheme shown in FIG. 6. FIG. 6 is a schematic diagram which shows the synthesis of RAFT chain transfer agent anchored nanoparticles in MIBK (methyl isobutyl ketone). This approach allowed precise control of the graft chain density and molecular weight. Polymerization of the monomer proceeded via a 'living' radical polymerization technique. The methacrylate groups of the monomer were polymerized, leaving the PDMS side groups available for crosslinking due to partial discharges.

Table 1 Shows the various polymer grafted nanoparticles synthesized using the PDMS chemistry. The particles were synthesized with graft densities from 0.08 to 0.7 chains/nm2, molecular weights from 26 to 73×103 g/mol and side chain lengths of 700 and 1000 g/mol. The nanoparticles used were approximately 15 nm diameter spherical silica nanoparticles purchased from Nissan Chemical (Houston, Tex.). Two batches of particles (S6 and S7) contained a second polymer block to improve the compatibility of the particles with matrix. This block was synthesized using a copolymer of hexyl methacrylate and glycidyl methacrylate in a mass ratio of 4:1 for S6 and 2.5:1 for S7.

The chemical structure of hexyl methacrylate is shown in Formula (II).

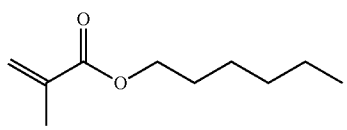

(II)

The chemical structure of glycidyl methacrylate is shown in Formula (III)

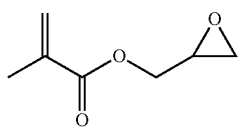

(III)

TABLE 1

Chain Density and Approximate Molecular Weights and Monomer Type of the Methacrylate-PDMS Polymer Grafted Nanoparticles.

| Sample Number | Sample Name | Graft density (Chains/ nm2) | Functional Block Molecular Weight (g/mol × 103) | PDMS Side Chain Molecular Weight (g/mol) | Compatible Block Molecular Weight (g/mol × 103) |
|---|---|---|---|---|---|
| S1 | PDMS | 0.08 | 32 | 700 | — |
| S2 | PDMS | 0.12 | 30 | 1100 | — |
| S3 | PDMS | 0.12 | 73 | 700 | — |
| S4 | PDMS | 0.33 | 31 | 700 | — |

TABLE 1-continued

Chain Density and Approximate Molecular Weights and Monomer Type of the Methacrylate-PDMS Polymer Grafted Nanoparticles.

| Sample Number | Sample Name | Graft density (Chains/ nm2) | Functional Block Molecular Weight (g/mol × 103) | PDMS Side Chain Molecular Weight (g/mol) | Compatible Block Molecular Weight (g/mol × 103) |
|---|---|---|---|---|---|
| S5 | PDMS | 0.7 | 26 | 700 | — |
| S6 | PDMS-HG | 0.2 | 10 | 1000 | 20 |
| S7 | PDMS-HG | 0.2 | 10 | 1000 | 15 |
| S8 | PDMS-G | 0.2 | 12 | 15000 | 23 |

Figure 7:
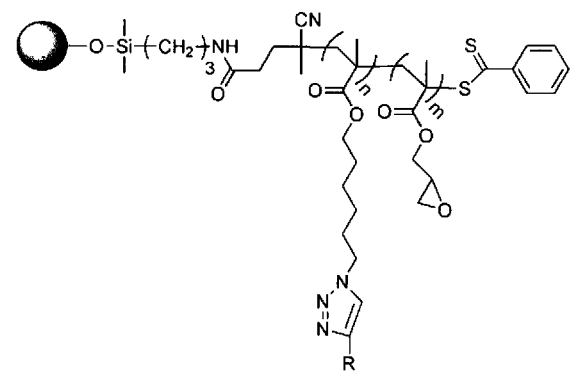
FIG. 7 is a diagram showing the chemical structure of a poly(dimethyl siloxane) PDMS-G functionalized nanoparticle having a glycidyl methacrylate outer layer.

A third chemistry with a compatibility improving outer block consisting of poly (glycidyl methacrylate) (PMGA) was also sythesized (PDMS-G). This chemistry involved the use of an altered synthesis route in order to keep the particles in solution during the polymerization reaction. First, poly(6-azido hexylmethacrylate) (PAHMA) was grafted to silica nanoparticles. From this, poly(glycidyl methacrylate) was grafted to create an epoxy compatible layer. Finally, PDMS was attached to the PAHMA inner block using a click method. This chemistry, which proved to be very compatible with the insulation epoxy polymer matrix, is shown in FIG. 7. FIG. 7 is a diagram of a nanoparticle containing PDMS-G block. The inner block of FIG. 7 is a functional methacrylate-PDMS of length (n) and the outer block of FIG. 7 contains an epoxy group. PDMS-G may be synthesized according to the following method.

PDMS-G Synthesis

Synthesis of 6-Azidohexyl Methacrylate (AHMA)

To a 500 mL round bottom flask, a solution of 1-azido-6-hydroxyhexane (14.3 g, 100 mmol), methacrylic acid (7.74 g, 90 mmol), and 4-dimethylaminopyridine (DMAP) (3.67 g, 30 mmol) in 100 mL of methylene chloride was cooled to 0° C. Dicyclohexylcarbodiimide (DCC) (20.63 g, 100 mmol) was dissolved in 50 mL methylene chloride and added slowly to the solution. The resulting mixture was warmed to room temperature and stirred overnight. The precipitate was removed by filtration. After removal of the solvent and silica gel column chromatography (10:1 mixture of hexane and ethyl acetate), the product was obtained as a colorless liquid (yield: 16.1 g, 85%).

Graft Polymerization of AHMA from 2-cyanoprop-2yl dithiobenzoate (CPDB) Anchored Silica Nanoparticles A solution of AHMA (2 g), CPDB anchored silica nanoparticles (0.4 g, 55 μmol/g), 2,2-azobis (4-methoxy-2,4-dimethylvaleronitrile) (2 μmol) and THF (6 mL) was prepared in a dried Schlenk tube. The mixture was degassed by three freeze-pump-thaw cycles, back-filled with nitrogen, and then placed in an oil bath at 30° C. for 6 hours. The polymerization was quenched in ice water. A small amount of polymerization solution was withdrawn to measure monomer conversion by NMR. The polymer solution was precipitated into methanol, filtered, and dried under vacuum.

Synthesis of SiO2-graft-(PAHMA-block-GMA)

A solution of SiO2-graft-PAHMA (Mn(cleaved PAHMA) =11600, Polydispersity index=1.2), glycidyl methacrylate (5 ML), 2,2-azobis(4-methoxy-2,4-dimethylvaleronitrile) (2 μmol) and tetrahydrofuran (THF) (10 mL) was prepared in a dried Schlenk tube. The mixture was degassed by three freeze-pump-thaw cycles, back-filled with nitrogen, and then placed in a 30° C. oil bath. After 12 hours, the polymerization solution was quenched in ice water and poured into an aluminum boat.

Click Functionalization of SiO2-graft-(PAHMA-block-GMA) Grafted Silica Nanoparticles A mixture of SiO2-graft-(PAHMA-block-GMA) grafted silica nanoparticles (a equiv of—N3), alkyne terminated polydimethylsiloxane (Mn-15 k) (2 equiv), and N,N,N',N'',N''-pentamethyldiethylenetriamine (PMDETA) (0.5 equiv) was dissolved in THF. The solution was degassed by bubbling nitrogen for 5 minutes and transferred to a vial containing CuBr (0.5 equiv) under a nitrogen atmosphere. The reactions were conducted at 30° C. After reaction, the mixture was diluted with methylene chloride and precipitated in methanol to remove the copper catalyst. After filitration, the product was dried under vacuum and dispersed in a 1:1 mixture of methylene chloride and chloroform.

Fluorine Based Polymers—Poly4,5,5-trifluoropent-4-enyl methacrylate

A fluorine based polymer was also tested to provide a plasma reactive functionality. The fluorine based monomer used to form the polymer was synthesized by the reaction of methacrylic acid and 4,5,5-trifluoropent-4-en-1-ol to yield 4,5,5-trifluoropent-4-enyl methacrylate. This yield was about 43%. The chemical structure of 4,5,5-trifluoropent-4-enyl methacrylate is shown in Formula (IV):

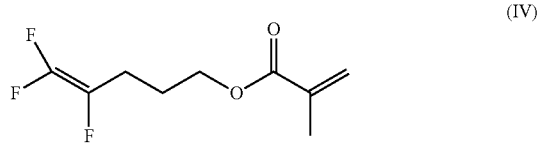

(IV)

The general grafting procedure was similar to that used for the PDMS functional grafted polymer. The RAFT chain transfer agent was anchored onto the silica nanoparticle surface and then 4,5,5-trifluoropent-4-enyl methacrylate was grafted from the surface. The methacrylate groups were polymerized, leaving the C=C bonds stabilized by fluorine available for crosslinking. Two different samples with well controlled molecular weight were synthesized. The molecular weights and reaction conditions are shown in Table 2.

TABLE 2

Fluorinated Chemistry Summary

| Sample Name | Synthesis Temperature | Reaction Time | Molecular Weight (g/mol) |
|---|---|---|---|
| S1 | 70° C. | 8 h | 7200 |
| S2 | 75° C. | 16 h | 22800 |

Nanocomposite Production

To make the nanocomposites, solvent (tetrahydrofuran or dichloromethane) was added to the epoxy resin and mixed. Bare and treated nanoparticles in solution were then added to the resin. The solvent was evaporated at ambient temperature and pressure for 12 hours to remove most of the solvent and mixed again. The mixture was placed in an oven at 50° C. under vacuum for 12 hours to remove the remaining solvent. Hardener was added at a resin to hardener ratio of 4:1. Mixing was performed in a dual asymmetrical centrifuge. Alumina balls were added to the mixture prior to adding hardener to aid in dispersion. After mixing, the composite was poured into a silicone mold containing a tungsten carbide needle.

Different polymerization conditions were used for the fluorinated polymer including different ratios of monomer to initiator (from 3000:1 to 1500:1 volume ratio), different temperatures (from 75° C. initiated by azobisisobutyronitrile to 45° C. initiated by 2,2-azobis(4-methoxy-2,4-dimethylvaleronitrile), and different RAFT agents (cyano(phenyl)methyl naphthalene-e-carbodithioate and 2-cyanoprop-2-yl dithiobenzoate).

Characterization

The materials were characterized in terms of dispersion, partial discharge and electrical or voltage endurance.

Dispersion

Dispersion of the composites was observed using optical microscopy and scanning electron microscopy (SEM).

Figure 8:
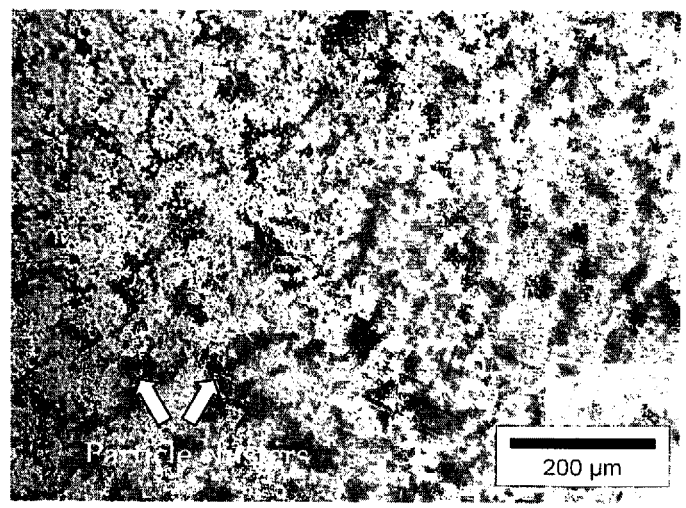
FIG. 8 is a scanning electron micrograph (SEM) showing the aggregation of nanoparticles functionalized with a poly (dimethyl siloxane) monomer (PDMS) within an epoxy matrix.
Figure 9:
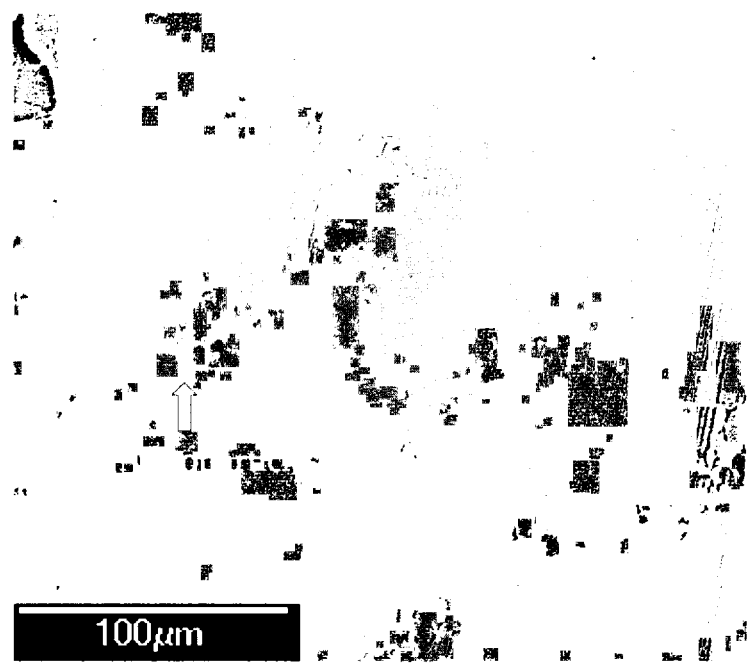
FIG. 9 is a photo micrograph showing the aggregation of PDMS functionalized nanoparticles within an epoxy matrix.

Three embodiments were characterized: PDMS functional polymer, PDMS functional polymer with an epoxy compatible outer block, and fluorinated polymer. Dispersion of the particles containing PDMS functional polymer show network-like aggregation of the particles. This aggregation can be seen in both optical and SEM images (FIG. 8 and FIG. 9). FIG. 8 is an optical image showing the aggregation of PDMS functional particles. Particle clusters in FIG. 8 appear as the darker areas in the image. FIG. 9 is a SEM image of aggregates in functionalized nanocomposites on a microtomed flat surface. Areas of silica within the image of FIG. 9 appear as lighter areas in the image.

Figure 10:
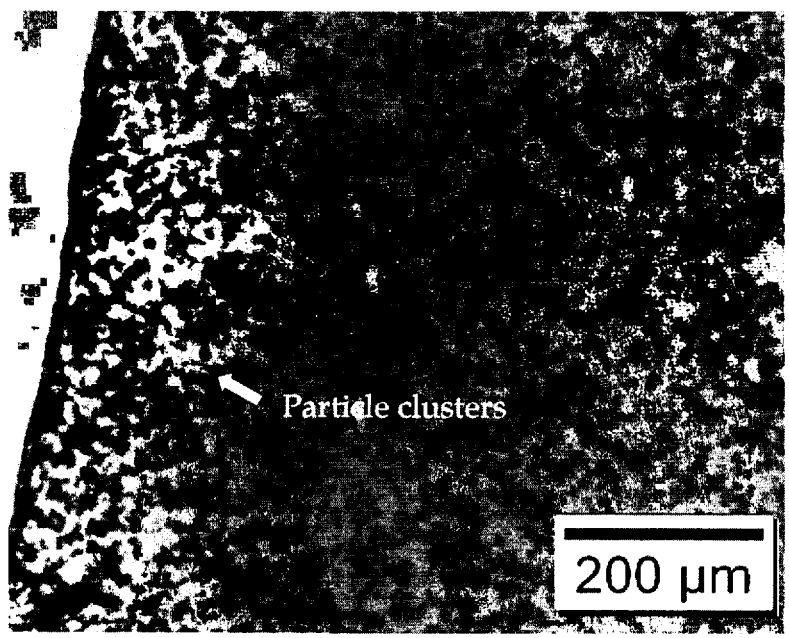
FIG. 10 is a SEM showing the aggregation of nanoparticles functionalized with a PDMS monomer and containing a hexyl methacrylate-glycidyl methacrylate compatible outer layer (PDMS-HG) within an epoxy matrix.
Figure 11:
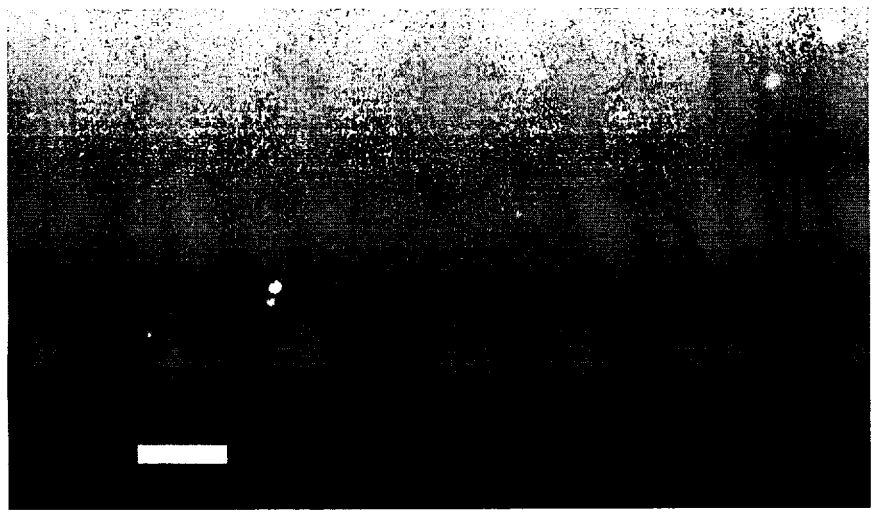
FIG. 11 is a SEM showing the dispersion of nanoparticles functionalized with a PDMS monomer and containing a glycidyl methacrylate compatible outer layer (PDMS-G) within an epoxy matrix.

In order to improve the compatibility of the discharge reactive polymer with the epoxy matrix, an epoxy reactive chemistry was grafted to the particle as an outer block. The compatible block consisted of hexyl methacrylate and glycidyl methacrylate monomer for PDMS-HG materials. FIG. 10 is an optical image of composite containing PDMS functional particles with a hexyl methacrylate-glycidyl methacrylate compatible block. Darker areas within the image of FIG. 10 indicate particle clusters. Although the glycidyl methacrylate contains epoxide functional groups, which should chemically bond with the matrix, no significant change in the dispersion of the composites was seen in FIG. 10. Use of only glycidyl methacrylate for improving compatibility was more effective at improving the dispersion. FIG. 11 shows an SEM image of a dispersion of PDMS-G nanocomposite at 0.2 wt % loading. The scale bar is 1 μm. Some agglomeration is still present, but the agglomerates are limited to 100-200 nm.

Partial Discharge

The partial discharge characteristics were measured for some samples to characterize the tree growth. Representative partial discharge data is shown in FIG. 12A, FIG. 12B, FIG. 13A, FIG. 13B, FIG. 14A and FIG. 14B.

Figure 12A:
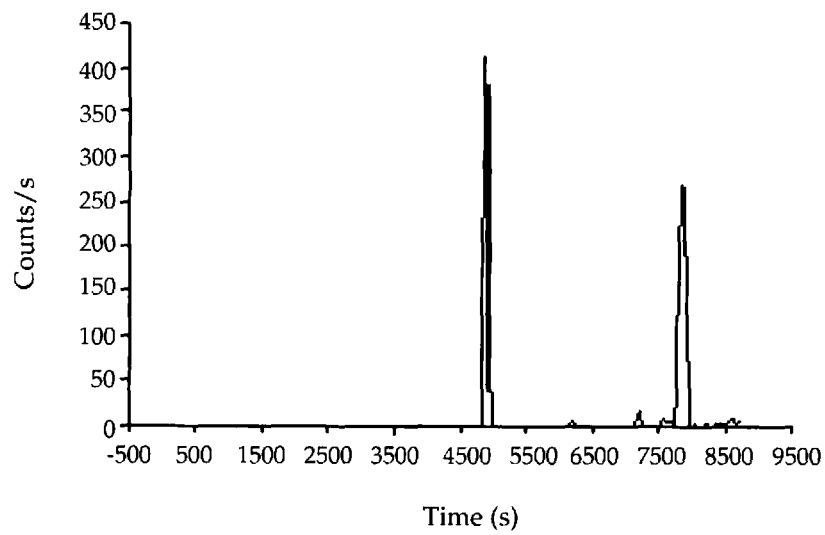
FIG. 12A is a graph showing counts per second of the partial discharge of unfilled epoxy.
Figure 12B:
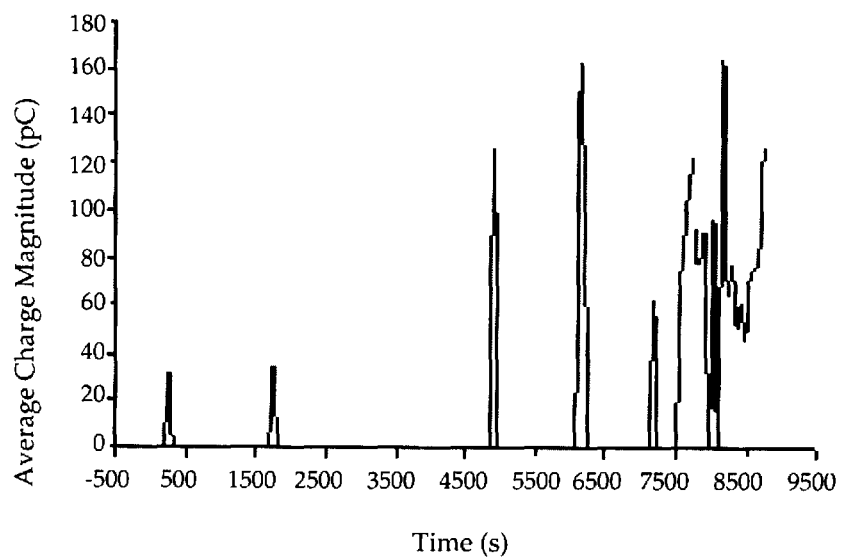
FIG. 12B is a graph showing average charge magnitude of the partial discharge of unfilled epoxy.

FIGS. 12A and 12B are graphs showing the partial discharge counts for unfilled epoxy. Failure occurred at 5100 s and voltage was at 10 kV.

Figure 13A:
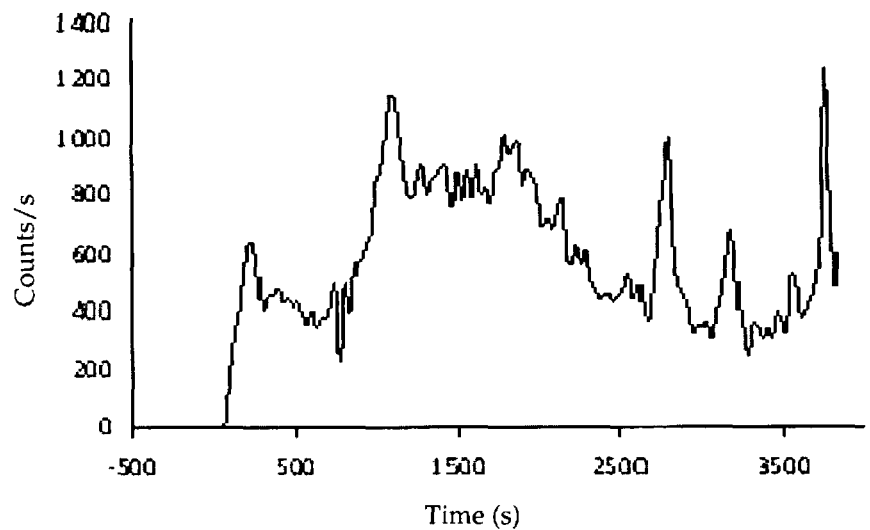
FIG. 13A is a graph showing counts per second of the partial discharge of epoxy filled with 1 wt % PDMS treated nanoparticles having a hexyl methacrylate-glycidyl methacrylate compatible outer layer (PDMS-HG).
Figure 13B:
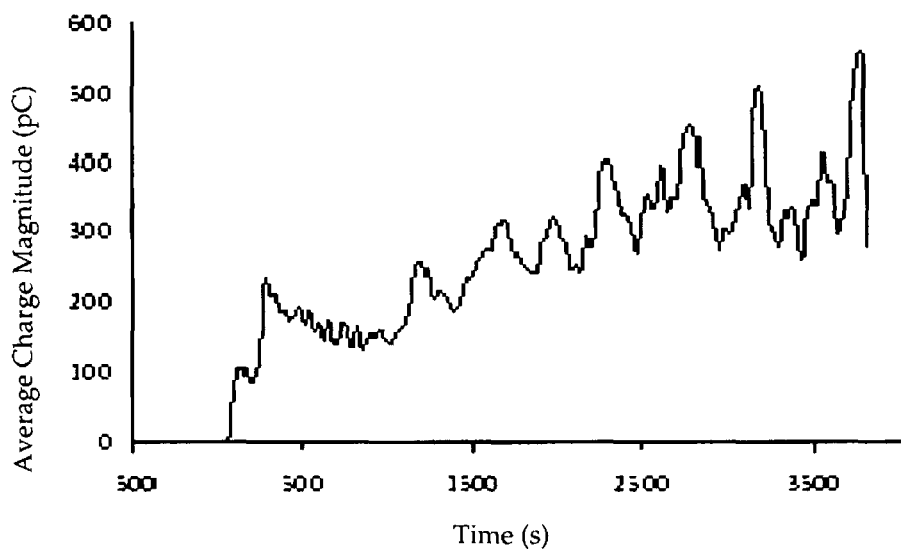
FIG. 13B is a graph showing average charge magnitude of the partial discharge of epoxy filled with 1 wt % PDMS treated nanoparticles having a hexyl methacrylate-glycidyl methacrylate compatible outer layer (PDMS-HG).

FIGS. 13A and 13B are graphs showing representative partial discharge counts for 1 wt % PDMS-HG (functionalized silica nanoparticle with hexyl methacrylate-glycidyl methacrylate outer layer). Partial discharge breakdown occurred at 3800 s and voltage was at 10 kV.

Figure 14A:
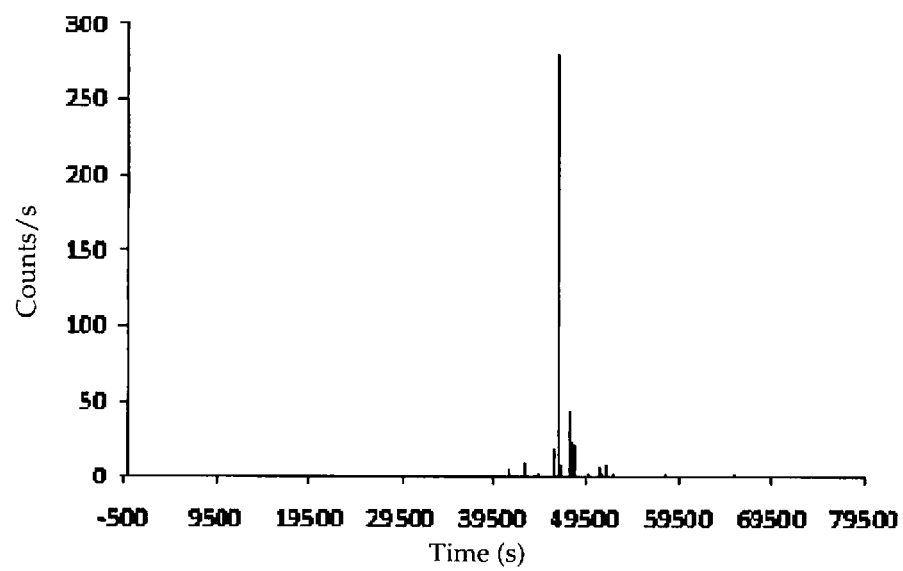
FIG. 14A is a graph showing the average charge magnitude of the partial discharge of epoxy filled with 0.2 wt % PDMS treated nanoparticles having a hexyl methacrylate-glycidyl methacrylate compatible outer layer (PDMS-HG).
Figure 14B:
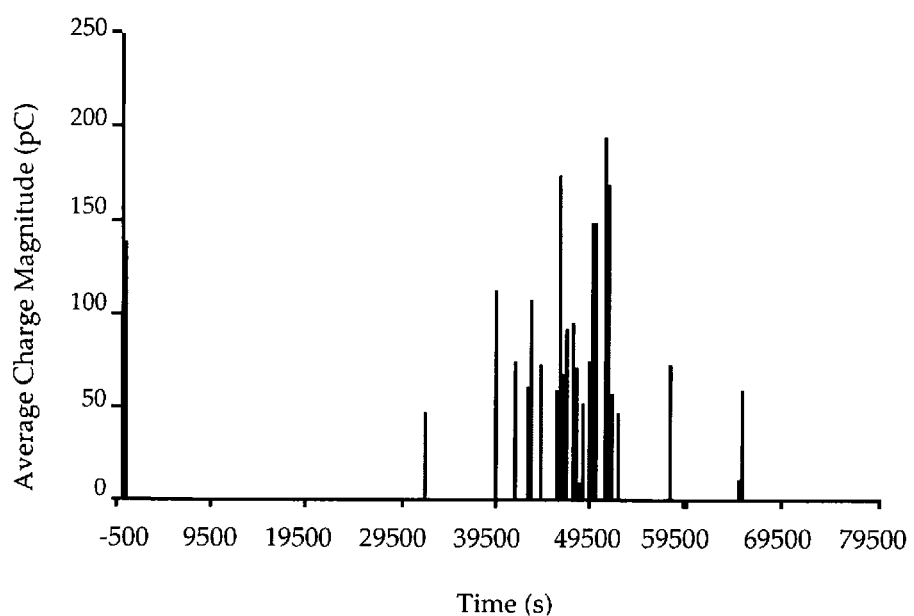
FIG. 14B is a graph showing the average charge magnitude of the partial discharge of epoxy filled with 0.2 wt % PDMS treated nanoparticles having a hexyl methacrylate-glycidyl methacrylate compatible outer layer (PDMS-HG).

FIGS. 14A and 14B are graphs showing representative partial discharge counts for 0.2 wt % PDMS-HG (functionalized silica nanoparticle with hexyl methacrylate-glycidyl methacrylate outer layer) from test start to sample failure. Partial discharge breakdown occurred at 64500 s and voltage was at 10 kV.

In general, for the unfilled epoxy and untreated silica nanocomposites, the magnitude of the partial discharge events was smaller than the background noise except for occasional spikes in the discharge magnitude. This was also true in the case of low loadings of the PDMS-HG functional particles.

However, at higher loadings of the PDMS-HG nanoparticles, a large number of discharge events were measured with amplitude well above the background noise. These discharge events correspond to lower voltage endurance.

Partial discharges were monitored at the lower end of the applied voltages (10 kV) where the best improvements are found and where growth of the trees are driven more by successive partial discharge activity than local solid state breakdown. Discharge measurements at higher voltages typically yield more readily apparent discharge magnitudes; however, based on the results here, benefits to the voltage endurance are much more likely at lower voltages, and the discharge activity is not likely indicative of the mechanisms happening at the lower voltages. It was found that, at low loadings, the materials containing particles with compatible groups showed very intermittent measureable discharges, indicating that most of the discharges were below the noise threshold; this behavior was similar to the unfilled material. Conversely, at the higher loadings the discharge magnitude and frequency was much higher, indicating increased activity. This may be linked to the large defect size introduced due to the large agglomerates.

Prior to treeing, local breakdown and small local voids less than 1 μm can be generated. This means that the subject approach is applicable even at the very early stages of tree growth. Improvement in the compatibility between the matrix and the polymer grafted particles also provides an improvement in the properties. Agglomeration is seen at modest loadings for all systems. When better dispersion is achieved, further improvements will be observed because of the well dispersed higher concentration of self-healing chemistry. At higher loadings the presence of the treated nanoparticle cores can also help to shield the polymer from damage due to partial discharges within the tree channels, as the nanoparticles build up at the surface of the tree channels similar to the effects seen in the untreated nanoparticles. However, even with an imperfect dispersion, the addition of the self-healing functionalized nanoparticles improves voltage endurance in the polymeric electrical insulation materials.

Voltage Endurance

Electrical endurance was measured by using a divergent field (needle-plane) test, which facilitated initiation and growth of electrical trees in the polymer insulation materials.

Carbon paint was applied to the sample face opposite the needle end to create a ground plane for testing. Testing was performed at ambient temperature and at a frequency of 60 Hz. The stress at the tip of the needle was calculated using the following equation:

$$E = 2V/r \ln(4d/r)$$

where E is the peak field at the needle tip, V the applied voltage, r is the radius of the needle tip and d is the distance between the needle tip and ground. Samples were tested until failure while immersed in oil to minimize the likelihood of corona discharges around the needle. During the testing of certain samples, the partial discharges were measured using a Biddle discharge detector. The detector was connected to a computer for data recording.

Figure 15:
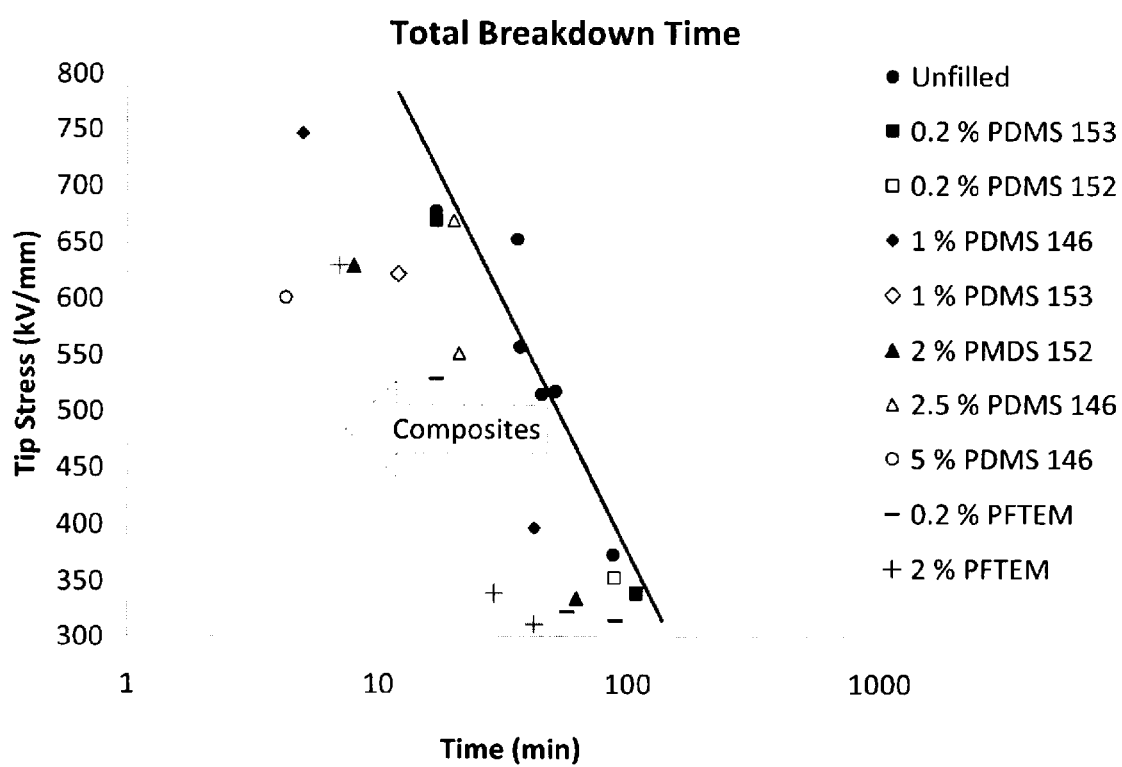
FIG. 15 is graph showing the voltage endurance of nanocomposites having no compatible outer layer.

Due to the agglomeration in the treated particle systems, tree growth could not be measured optically for the treated particles. The systems were compared based on total breakdown time and the partial discharge characteristics. Nanoparticles treated only with the PDMS functional or fluorinated polymers showed a drop in voltage endurance compared to both the unfilled polymer and the untreated nanoparticles. This is shown in FIG. 15. FIG. 15 is a graph of the endurance data (Tip Stress (kV/mm) versus time (min)) of various treated particle systems with no compatiblized layer. For the treated materials, the higher particle loadings (1 and 2 wt %) dropped the voltage endurance by about an order of magnitude. At the lower loadings (0.2 wt %) the drop in voltage endurance is low in magnitude, but still present.

Figure 16:
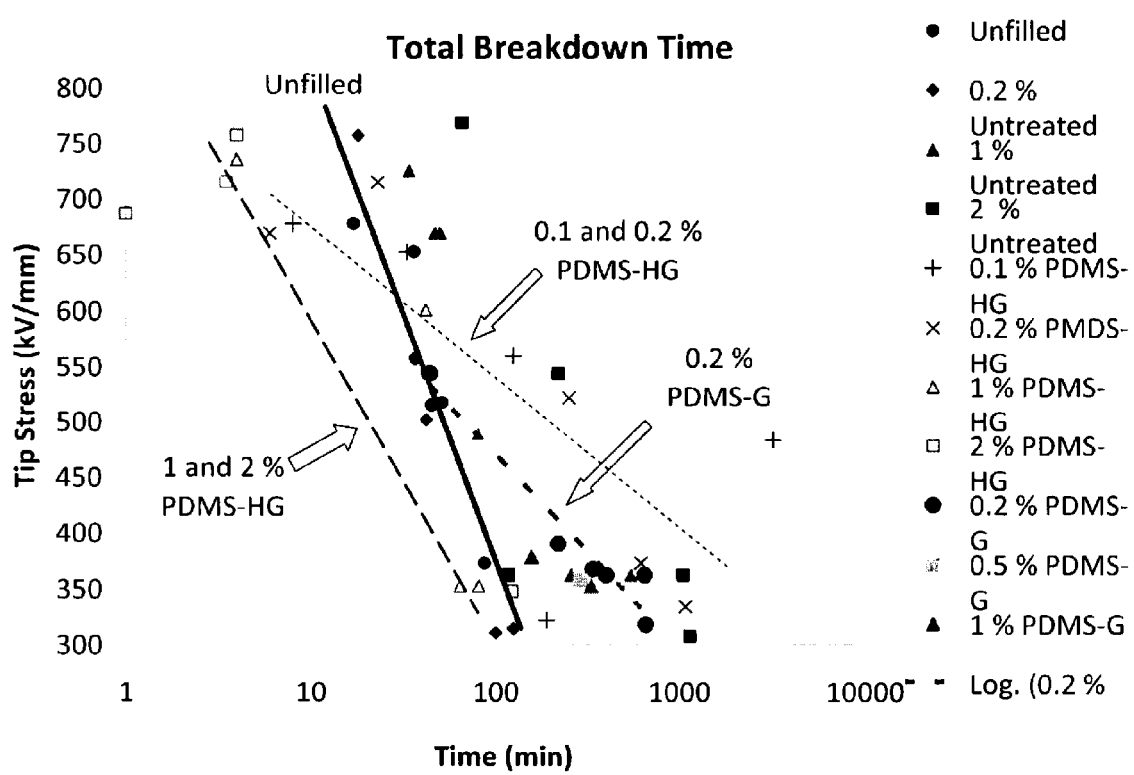
FIG. 16 is a graph showing the voltage endurance of unfilled epoxy nanocomposites having untreated nanoparticles and nanoparticles having a compatible outer layer.

The addition of the PDMS-HG and PDMS-G treated nanoparticles at low loadings (0.1 and 0.2 wt %) to the insulation polymer matrix improves the time to breakdown consistently at low tip stresses (below 550 kV/mm, or about 15 kV applied voltage). However, at higher loadings (1 and 2 wt %) the addition of PDMS-HG caused a drop in the voltage endurance compared to the unfilled polymer matrix material, while the addition of PDMS-G gave endurance life greater than the unfilled polymer matrix material but less than similarly loaded untreated silica nanoparticles. A summary of the data for unfilled, untreated and treated silica with the epoxy compatible group is shown in FIG. 16. FIG. 16 is a graph of the voltage endurance (Tip Stress (kV/mm) versus time (min)) of several treated nanoparticles having a compatible layer and several untreated nanoparticles, as well as unfilled epoxy. Lines within FIG. 16 are provided for qualitative assessment of the behavior of low and high loadings of PDMS-HG materials. For the unfilled polymer, composites with untreated nanoparticles and composites at 0.2 wt % loading of PDMS-G, the time to tree initiation could also be measured using optical microscopy. Comparing the conditions with the largest improvement (tip stresses less than 400 kV/mm), tree initiation started in less than 15 minutes, meaning that the improvement in the voltage endurance is thought to occur primarily during the growth stage of treeing.

The addition of untreated (bare) silica at 1 and 2 wt % can increase the voltage endurance of the epoxy at the lower fields, consistent with other systems (FIG. 16). Improvements in voltage endurance have been attributed to a number of sources. At the beginning of the process, nanoparticles can reduce charge injection and delay the time needed for tree inception. After tree inception, nanoparticles can slow the growth of electrical trees leading to an increase in the time required for electrode bridging. In this system, tree inception time does not increase with the addition of untreated silica nanoparticles. This means that the improvement in the time to breakdown at 1 and 2 wt % may be related to changes during the growth phase of the electrical trees. During the growth of trees, partial discharges lead to progressive degradation of the polymer matrix leading to both extension and widening of tree channels. Accumulation of nanoparticles at the surface of the tree channels can help to prevent damage to the polymer matrix as the inorganic ceramic nanoparticles are more resistant to partial discharge damage.

The addition of treated nanoparticles with no compatible layer (PDMS and PFTEM samples) led to a drop in the voltage endurance at all loadings (FIG. 15). Though the chemistries of these particles have the potential to provide a self-healing mechanism, the effects of incompatibility with the polymer matrix appear to dominate the behavior of the composites. In this case the nanoparticles are not well dispersed. In order for the self-healing mechanism to act, the trees need to have a high likelihood of encountering the modified nanoparticles. As the tree grows in the well dispersed system the tree channel is likely to interact with the functional polymer on the surface of the nanoparticle. As partial discharges within the tree channel occur, these can activate crosslinking within this polymer layer. With the agglomeration present, there are large areas of unfilled material where the tree can grow. Additionally, due to the poor compatibility, the interface between the grafted polymer and the polymer matrix will be weak, increasing the likelihood of local tree propagation along the interface. It appears the treated nanoparticles without a compatible layer may act as defect sites in the matrix, reducing the endurance life, rather than providing a self-healing behavior.

The poor response of the nanoparticles modified with only a self-healing chemistry can be overcome by adding a compatibility improving outer block to the grafted polymer. Two different compatibility improving blocks are exemplified above, used in conjunction with PDMS functionalized nanoparticles. One set of nanoparticles utilized a combination of hexyl methacrylate and glycidyl methacrylate in the compatible layer. The second approach used only glycidyl methacrylate. In both cases, the epoxide groups in the glycidyl methacrylate provide enthalpic compatibility with the polymer matrix as well as the ability to form covalent bonds with the polymer matrix.

Figure 17:
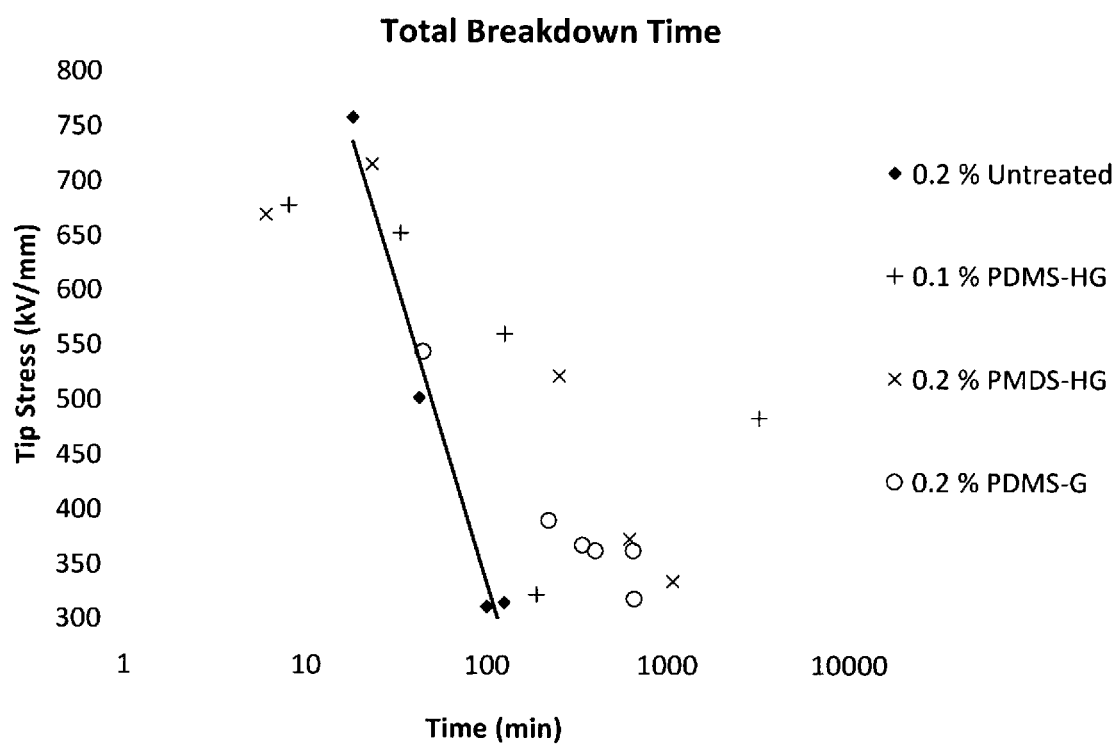
FIG. 17 is a graph showing the voltage endurance of insulation materials having low loadings of PDMS-HG and PDMS-G.

The addition of the compatibility improving blocks improved the voltage endurance over the functionalized nanoparticles with no compatible layer. For both types of compatible layers (PDMS-HG and PDMS-G), low loadings (0.1 and 0.2 wt %) improve the voltage endurance compared to similarly loaded untreated silica nanocomposites and the unfilled matrix, as is shown in FIG. 17. FIG. 17 is a graph of the endurance data (Tip Stress (kV/mm) versus time (min)) comparing low loadings of PDMS-HG and PDMS-G grafted silica nanoparticles to 0.2% untreated silica nanoparticles in the polymer matrix. At lower loadings of the PDMS-G grafted nanoparticle, tree initiation could be observed and it was found that initiation was not delayed for these samples, indicating the improvement in endurance was due to reduction in the growth rate of the trees.

At high loadings, the PDMS-HG nanocomposites may experience a drop in the voltage endurance. Agglomeration of PDMS-HG nanocomposites and compatibility with the polymer matrix is similar compared to the PDMS particles. The partial discharge data shows that at 1 wt % the frequency and magnitude of the partial discharges is greatly enhanced. This indicates that at the higher loadings, where particles are more likely to interact and form larger agglomerates, the nanoparticles may act as defect sites and enhance the rate of damage to polymer. At high loadings of the PDMS-HG samples (1 and 2 wt %), the detrimental effects of the agglomeration due to the introduction of defects may neutralize any benefits from the functional polymer.

By removing the hexyl methacrylate group, the dispersion of the nanoparticles was improved. Compared to the PDMS-HG samples, the 1 wt % the PDMS-G nanocomposites gave an improvement over the unfilled epoxy. The improvement was less than the improvement seen at 0.2 wt % PDMS-G. An optimal loading may be found below 1 wt %. By improving dispersion of the functionalized nanoparticles, the distance between tree-nanoparticle interactions decreases, helping to improve the voltage endurance.

By grafting polymers with self-healing moieties such as PDMS side chains onto the surface of nanoparticles to impart a self-healing behavior to the nanocomposite polymer insulation system, the voltage endurance of the polymer, such as epoxy can be improved by more than 1 order of magnitude at loadings as low as 0.1 and 0.2 wt % of the particle core. At the same loadings of untreated nanoparticles, there is no measureable difference between the voltage endurance of the nanocomposite and the unfilled polymer material. Improvements in voltage endurance are obtained by improving the compatibility of the interface between the functionalized polymer grafted onto the nanoparticle and the polymeric matrix. Even in the presence of agglomeration, by improving the interface, the voltage endurance of the nanocomposite can be improved. When particle loading is high and not well dispersed (leading to large agglomerates), the preferential degradation along the interfaces leads to a reduction in voltage endurance. Improvements in the dispersion of the compatible, functionalized nanoparticles in the polymer matrix can further improve the voltage endurance. Improving the compatibility of the polymer matrix and the self-healing polymer may allow the self-healing polymer functionalized nanoparticles to be better dispersed in the polymer matrix. Gains in the voltage endurance can be realized at very low loadings.

While the present electrical insulation has been explained in relation to certain embodiments, it is to be understood that various modifications thereof will become apparent to those skilled in the art upon reading the specification. It should be understood that the embodiments described above may be practiced in the alternative, or in combination, as appropriate. Therefore, it is to be understood that the present disclosure is not limited to the specific embodiments described above, but includes variations and modifications defined by the following claims and equivalent embodiments.

We claim:

1. Electrical insulation comprising a polymeric matrix having compounded therein, a functionalized dielectric nanoparticle filler comprising a self-healing moiety, dispersible in the polymeric matrix, wherein the electrical insulation is capable of self-healing upon exposure to internal corona discharge.

2. The electrical insulation of claim 1, wherein the nanoparticle filler is at least one of metal borides, metal carbides, metal carbonates, metal nitrides, metal oxides, mixed metal oxides, metal silicates, metal titanates, carbon nanotubes, carbon or ceramic nano-fiber whiskers, alumina, silica, titania, zirconia, aluminum nitride, barium oxide, barium strontium titanate, barium titanate, calcium oxide, glass particles, kaolin clay, magnesium aluminum silicate, magnesium calcium silicate, magnesium oxide, silicon carbide, strontium oxide, strontium titanate, talc, zinc oxide, zirconium silicate or mixtures thereof.

3. The electrical insulation of claim 2, wherein the nanoparticle filler has a particle diameter ranging from about 5 nm to about 100 nm.

4. The electrical insulation of claim 1, wherein the nanoparticle filler comprises from greater than 0 to about 5 % by weight of the electrical insulation, optionally from about 0.1 % to about 1 % by weight of the electrical insulation.

5. The electrical insulation of claim 1, wherein the nanoparticle filler is functionalized with multiple polymer chains, wherein at least one of the multiple polymer chains comprises a self-healing moiety.

6. The electrical insulation of claim 1, wherein the nanoparticle is functionalized with a moiety that covalently links the nanoparticle to the self-healing moiety.

7. The electrical insulation of claim 1, wherein the self-healing moiety comprises a plasma reactive moiety.

8. The electrical insulation of claim 7, wherein the plasma reactive moiety is thermally stable at temperatures up to at least 200 ° C. and wherein the plasma reactive moiety is unreactive during compounding of the nanoparticle filler and the polymeric matrix.

9. The electrical insulation of claim 7, wherein the plasma reactive moiety is capable of crosslinking with at least one of the polymeric matrix or with the plasma reactive moiety of a neighboring functionalized nanoparticle filler upon exposure to corona discharge plasma.

10. The electrical insulation of claim 7, wherein the plasma reactive moiety comprises at least one polymerizable monomer or monomer residue that contains either a carbon-carbon double bond or a carbon-carbon triple bond.

11. The electrical insulation of claim 10, wherein the polymerizable monomer or monomer residue that contains either a carbon-carbon double bond or a carbon-carbon triple bond is at least partially fluorinated.

12. The electrical insulation of claim 11, wherein the fluorinated polymerizable monomer is 4,5,5-trifluorpent-4-enyl methacrylate.

13. The electrical insulation of claim 7, wherein the plasma reactive moiety comprises at least one of a siloxane side group of a polymer chain or a linear siloxane block incorporated into a polymer chain backbone.

14. The electrical insulation of claim 13, wherein the plasma reactive moiety comprises polydimethyl siloxane.

15. The electrical insulation of claim 7, wherein the plasma reactive moiety comprises benzocyclobutane (BCB).

16. The electrical insulation of claim 1, wherein the polymeric matrix comprises at least one of epoxy, polyethylene, polypropylene, polyimide, polyamide, polystyrene, polystyrene-butadiene, polysulphone, polyvinylidene fluoride, polyamideimide, phenolics, polyether ether ketone, polyurethane, polyurea, polyvinylchloride, polyvinylidenechloride, polytetrafluoroethylene, formaldehyde-based resins, polyphenylene sulfide, polysulfone, or mixtures or copolymers thereof 17. The electrical insulation of claim 16, wherein the polymeric matrix is epoxy.

18. The electrical insulation of claim 1, wherein the functionalized dielectric nanoparticle filler comprises a compatibility improving outer block capable of improving the compatibility of the nanoparticles with the polymeric matrix.

19. The electrical insulation of claim 18, wherein the compatibility improving outer block comprises a copolymer of hexyl methacrylate and glycidyl methacrylate (PDMS-HG).

20. The electrical insulation of claim 18, wherein the compatibility improving outer block comprises poly(glycidyl) methacrylate (PGMA).

21. The electrical insulation of claim 1 wherein the self-healing moiety is adapted to provide a cross linking agent to effect self-healing in the polymeric matrix, or to provide a polymerizable material to form new polymer in a micro-void, or to provide a chromophore to generate local heating and melting of a portion of the polymeric matrix.

* * * * *